Patented June 5, 1934

1,961,588

UNITED STATES PATENT OFFICE 1,961,588

PROCESS OF PRODUCING PLASTIC PRODUCTS

Lemuel R. Jones, Petersburg, Va.

No Drawing. Application May 24, 1929, Serial No. 365,795

10 Claims. (Cl. 260—2)

The invention relates to processes of producing plastic products, and more particularly to processes of producing such products from crude vegetable material containing large percentages of carbohydrates, preferably containing one or more forms of cellulose, the material thus embracing such substances as peanut hulls, oat hulls, cotton seed hulls, cotton seed hull bran, corncobs, and the like. The invention is an improvement upon that described in my application, Serial No. 51,509, filed August 20, 1925, "Plastic products and processes of producing same", (refiled June 19, 1929, as Serial No. 372,227 now Patent 1,917,038).

In my said application I described a process of producing a plastic product, in which a carbohydrate-containing vegetable material was heated with a phenolic body and an acid agent, preferably with a greater proportion of the vegetable material than of the phenol. This treatment was continued until a sticky, gummy, partially-disintegrated mass was produced. This product was finely divided, and water soluble substances and uncombined acids removed therefrom. Thereby was formed a composition, preferably in powdered form, which, with or without other ingredients, was adapted to be molded under heat and pressure to produce hard coherent bodies, which are mostly infusible and insoluble to a considerable extent.

An object of the present invention is to improve the method described in my said application, in order to produce a stronger and better product, which shall have desired molding characteristics, particularly a desired freedom of flow in the mold. Other objects comprise the provision of improved and simplified methods, and steps thereof, for producing plastic products or molding compositions, all as will be more fully described in the following specification, and be particularly pointed out with appended claims.

The invention comprises various improvements, which may be included in several alternative methods. One of these improvements consists in neutralizing the powder or material which is produced, with the aid of an acid, by the first reaction, and which preferably has mixed therewith a hardening agent such as hexamethylenetetramine. This neutralization is effected by suitable amounts of a suitable alkali salt.

Another feature of improvement, in preferred forms of the process, consists in the subjection of the material to a second cooking operation, after the hexamethylenetetramine has been added, and either after or before the alkali salt has been added, the reaction thereby produced being insufficient to prevent proper flowing in the mold when the material is later given its final hardening reaction therein. This second cook is thought to cause an intermediate or incomplete reaction with the formaldehyde evolved from the hexamethylenetetramine and also partial splitting up of the alkali salt, when the latter has been added before the cook, the parts thereof at least partially neutralizing the acids in the molding powder, and also combining with the ammonia evolved by the hexamethylenetetramine, or the like, to neutralize it. When the alkali salt is added after the cook, the cooking is believed to have the effect of forming a weak bond between the ammonia evolved from the hardening agent and some element of the molding powder, this ammonia recombining, later, in the reaction in the hot mold, with the acid ions of the alkali salt. The exact nature of these reactions is not clearly understood, but the practical effect is clearly to improve the product and process, to produce a product which is freer-flowing, and acts better, in the mold, and a final, molded, product, which is stronger, because of the treatment.

The process just indicated is therefore one of three stages, in the first of which a reaction takes place between the raw vegetable product and a phenol, with the aid of an acid agent, such as hydrochloric acid. The second reaction is that just described, after hexamethylenetetramine has been added, and the third stage comprises the final reaction in the hot mold.

The improvements described herein have also resulted in simplifying and cheapening the process, inasmuch as various washing steps may now be omitted, and grinding the material in water is no longer called for, in some forms of the process. The process is likewise cheapened by the considerable proportion of inexpensive alkali salts which may now be included in making the product.

In order that the invention may be more clearly understood, I will now describe several embodiments of the process. The first stage may be the same in all these forms. It consists in cooking a mixture of vegetable material, such as peanut hulls, with a phenol or cresol or the like, together with hydrochloric acid. This is carried out in a closed vessel, at temperatures, and for lengths of time, which may vary within considerable limits. The result is the formation of the blackened, sticky, gummy material described in my said prior application, which is a fusible, resinous material capable of further hardening reaction in the mold. This product contains a proportion of cellulose fibers in a more or less degenerated and broken down condition, as previously stated, together with resinous binding material. The degraded fibre is useful as filling material in the final product, but stronger products are obtained by the addition of other fillers, as will be explained later.

As one specific example, two parts of peanut hulls (either ground or unground) may be mixed with 1¼ to 1½ parts of cresylic acid and ⅜ parts of muriatic acid (about 36% HCl). This may be cooked in a closed vessel for about four hours at about 100° C.

If the starting material is cottonseed hulls or cottonseed hull bran, I find that in order to get a material that will melt and flow properly in the hot mold, larger proportions of cresylic acid must be used than when peanut hulls are used. In order to get a satisfactory material with cottonseed hulls, for example, the cresylic acid has to be increased about 25%. Thus where 1¼ parts of cresylic acid are used with peanut hulls, 1½ parts would be used with cottonseed hulls or cottonseed hull bran. This is apparently due to the fact that the pentose content of cottonseed hulls and cottonseed hull bran is greater than that of peanut hulls. With other vegetable materials, such as oat hulls, for example, a variation in the percentage of the phenolic body will be required, and, of course, the different vegetable substances will require different proportions of phenol, if that be substituted for cresol. The test in each case is to provide a sufficient proportion of the phenol or cresol to make a resinous product which will be of desired fusibility.

I note that phenol, (carbolic acid), gives better results, according to my experience, than cresylic acid. It seems to make a somewhat stronger and more elastic material, and seems to give other advantages. Among these the material made with phenol is insoluble in alcohol, whereas the material made with cresylic acid will, in time, show some solubility in alcohol, unless a large amount of hexamethylenetetramine is added, and a long cure in the mold is given. Proportions of materials, as stated above, should be such as to give sufficient fusibility when the material is molded. There can, however, be considerable variation.

The time of cooking the mixture can be widely varied, and the reactions obtained at varying temperatures. For example, excellent strong products have been made from peanut hulls, phenol and hydrochloric acid, in this first reaction, cooked for one and one-half hours at temperatures of about 103° C. to 105° C. Good products also are obtained when the cook is extended to from three to four hours. A longer period of cooking apparently forms a larger proportion of resinous material, but the product is less strong and tough, other factors being equal, than one which has been given a shorter cook. This may be due to the weakening caused by too great a breaking down of the cellulose fibres. The time necessary for the reaction is shortened by raising the temperature. Good products are made by cooking the material for one hour at about 120° C. to 125° C.

The time of cooking to form the initial reaction may be said to vary, permissibly, from about one-half hour to four hours, and the range of temperature from about 90° C. to about 125° C., with shorter times being taken for higher temperatures, and tougher and more elastic products made by the shorter cooks. With the shorter cooks, the initial reaction is, of course, not permitted to go as far towards completion, at this stage, as with longer cooks, the reaction then being completed in the hot mold.

After the first reaction is completed, the blackened mass is taken out of the closed vessel in which it was cooked. It may now be treated in several alternative ways. It may be subjected to grinding in cold water, with subsequent boiling and washing, as described in my prior application. I prefer, however, to follow other methods which I have now discovered, in order to avoid the boiling and washing steps.

In accordance with one of these methods, the material is taken from the closed vessel immediately it has completed its allotted time, and is put in cold water and ground in a pebble or ball mill until perfectly fine (usually ¾ to 1 hour). Ground wood filler can be added here, and the mill run for a few minutes longer to mix the wood in thoroughly. The water is then drained off and the material dried at a temperature of 100° C. to 110° C. Varying proportions of this filler may be used, for example, three parts of powder and two parts of ground wood. Other examples will be given later. The wood flour or the like can, of course, be added later, but the mixture during the wet grinding is advantageous, since, in the subsequent drying, the resinous reacted material melts over the particles of wood and coats them more thoroughly than can be done in a dry mix. The finished molded product is apparently stronger, and has a better finish, when this is done. The dried powder is now ready for mixing with hexamethylenetetramine and alkali salts.

In place of the grinding process, the blackened mass, on being taken from the closed vessel, may be exposed to the atmosphere for from two to five days. During this time certain volatile matter escapes, and the material hardens. The time of hardening can be greatly shortened by heating it to a low temperature, say 100° C. to 125° C., while it is spread exposed to the air.

The subsequent treatment, after either the grinding and drying or the exposure to the air, involves the addition of the alkali salts either with or without the second cooking process. According to one method, when the wood filler has not already been added, the procedure may be as follows, a specific example being given. Five parts of the molding powder are mixed with 35/100 parts of hexamethylenetetramine, and cooked in a closed vessel for from twenty minutes to two hours, at a temperature of about 121° C. When sufficient reaction has ensued, 3.5 parts of barium sulphate and two parts of wood flour are mixed with the product; also naphthalene, if greater fluidity is desired.

According to an alternative method, the molding powder, the hexamethylenetetramine, and the barium salt may be mixed together and cooked in the oven together, the proportions being the same, and the time and temperature of the cook the same, as in the example just given. After the cook, the ground wood and a little naphthalene may be added, and thoroughly mixed in. This method seems to give a product with a better finish than the method just described, in which the barium salt is added after the second cook, instead of before it.

If the proportions are exactly correct, there need be in most cases no second cook. The molding powder, the barium salts, the hexamethylenetetramine, and naphthalene, if desired, are cold mixed and put in the molds. The second cook appears to be useful chiefly in eliminating the gases arising from slightly inaccurate proportions of ingredients. If a second cook is used, the proper duration thereof may be determined by the trial molding of a sample of the product. The longer the cook, the more infusible the product becomes. Therefore, the desired fusibility of the product determines the proper duration of this second cook.

The product made by any of the methods given, with the elements properly mixed together, is ready to be molded, the final reaction taking place in the mold under heat and pressure. The molding time may be less than seven minutes.

An example of my present preferred practice when the boiling and washing steps are used, will also now be given. In this, the product of the first cook is ground in cold water as described. The product, in the same water in which it was ground, may then be brought to a boil and boiling continued for about fifteen minutes. It is then washed once or twice with hot water and two or three times with cold water. Or, instead of boiling, the ground material may be washed only, two or three washes being given with very hot water, followed by a wash with cold water. The product is then ready for drying, which is done at about 100° C.

As a further specific example, 100 parts of the dried powder, prepared as just described, may be thoroughly dry-mixed with 18 to 20 parts of barium sulphate or carbonate, and 5 to 7 parts of hexamethylenetetramine. The mixture is cooked in a closed vessel at about 121° C. for from one and one-half to two hours. To the resulting product is added naphthalene as a flux. Naphthylamine might be substituted for naphthalene. This is added dry and ground with the mixture. To the resulting powder is added ground wood, in, say, the proportion of three parts of the powder to two parts of the wood. When 5% of hexamethylenetetramine is used, about 4% of naphthalene is sufficient, but when 7% of the hexamethylenetetramine is used, from 5 to 7% of the naphthalene may be used.

Any tendency of this powder made of any of these processes to stick in the mold, in the subsequent molding, may be overcome by adding a fraction of one percent of stearic acid to the powder, at the same time the naphthalene is added.

In regard to the alkali salt to be added, in any of the methods described, I have obtained the best results with barium sulphate or carbonate, although the sulphates and carbonates of the other alkaline earth metals, such as calcium and strontium, may be used. It would seem that the salt used must be a salt of a bivalent metal. The salts of iron, lead, copper, etc., cause staining of the mold, and have other objections. These are the metals which are comparatively low in the electro-positive scale. Those which are higher in the electro-positive scale, such as sodium and potassium, also seem to cause some action on the metal of the mold, and to produce a less desirable final product. I have not had as great success with the hydroxides, of even the alkaline earth metals, as with the sulphates and carbonates, but it would seem that they should be effective as well as the sulphates and carbonates, if introduced at the time the blackened mass is ground in water.

The amount of the alkali salts used can be widely varied, the quantity depending upon a number of factors. The larger the proportion of phenol or cresol used in the initial reaction, the more alkali salts will have to be used. The length of time taken for the initial cook seems also to be a factor, since material given a short cook will take more of the alkali salt than material which is given a longer cook. The quantity of hexamethylenetetramine used is also a factor. It is also possible that the naphthalene, when added as a flux, may be a factor. When barium sulphate is used in large excess, a strong smell of sulphur is noticeable, indicating that the salt is probably split into barium oxide and $SO_3$ gas. When barium carbonate is used, the salt is apparently split into barium oxide and carbon dioxide. I understand the functions of the salt to be the neutralization of the acids in the molding powder and the ammonia evolved by the hexamethylenetetramine, the barium oxide neutralizing the acid in the molding powder while the acid radical from the salt neutralizes the ammonia. The quantity of alkali salt should be determined by the amount required to neutralize the molding powder, and no great excess or deficiency of the acid salt should be permitted. If the salt is used in slight excess, a small quantity of a weak acid such as stearic acid seems to correct the condition.

I note that powders having a large proportion of acid left in them after the initial reaction, requiring a large percentage of alkali salt to neutralize them, seem to make the best and strongest final products. Also, the more alkali salts added, the greater is the reduction in cost, for the reason that the alkali salts are cheap, and also that the reacted materials return more weight when the water-soluble acids are not taken out. The alkali salt can, accordingly, under different conditions, range in proportion from about, or somewhat above, an equivalent quantity by weight of the reacted powder to a small percentage thereof.

The final product, after molding, is, of course a hard, coherent body, infusible and insoluble to a considerable extent and suitable for many of the uses to which substances such as bone, hard rubber, phenol-formaldehyde condensation products, and other plastics, are put.

It should be noted that the term "a phenol" or the like, in the claims, is intended to include phenol, cresol, or cresylic acid, and equivalents. It should also be noted that the upper limit of permissible heating in the second cook is about 135° C. This second reaction should, of course, be not carried to such a point as to prevent proper flow in the mold during the final hardening reaction therein, giving regard to the fact that a fluxing agent, preferably naphthalene, may be included in the mass, if required. With a proper proportion of the alkali salt no blistering or other trouble caused by gas evolution should be experienced in the mold. It should also be noted that the invention is not limited to the exact details of the various examples which have been given by way of illustration, but is as broad as is indicated by the accompanying claims.

It should also be noted that the vegetable material used herein, consisting of certain parts of plants or trees, contains a mixture of several substances, including both soluble and insoluble carbohydrates (mono, di, and polysaccharoses). It is thought that the alkali salts used herein, such as barium sulphate or carbonate, form metallic derivatives either with the soluble saccharoses or their acid derivatives, thus rendering them largely insoluble.

What I claim is:—

1. A process of producing a plastic product, comprising, heating a carbohydrate-containing vegetable material with a phenol and a mineral acid agent with a greater proportion of the vegetable material than of the phenol, continuing the treatment until a sticky, gummy, fusible partially-disintegrated mass is produced, containing uncombined organic acid, soluble saccharoses and soluble products resulting therefrom, and mixing therewith an alkaline earth metal salt sufficient in quantity, upon subsequent heating, to neutralize or modify substantially all uncombined acid and soluble saccharoses and products thereof remaining in the product.

2. A process of producing a plastic product, comprising, heating a carbohydrate-containing vegetable material with a phenol and a mineral acid agent with a greater proportion of the vegetable material than of the phenol, continuing the treatment until a sticky, gummy, fusible partially-disintegrated mass is produced, containing uncombined organic acid, soluble saccharoses and soluble products resulting therefrom, and mixing therewith a methylene-containing, gas-evolving, hardening agent, and an alkaline earth metal salt, sufficient in quantity, upon subsequent heating, to neutralize or modify substantially all uncombined acid and soluble saccharoses and products thereof remaining in the product and to combine with gas evolved from the said agent.

3. A process of producing a plastic product, comprising, heating a carbohydrate-containing vegetable material with a phenol and a mineral acid agent with the proportions of phenol and vegetable material so adjusted that the heating produces a sticky, gummy, partially disintegrated mass, continuing the treatment until such a mass is produced, containing uncombined organic acid, soluble saccharoses and soluble products thereof, mixing therewith an ammonia-evolving methylene-containing hardening agent and an alkaline earth metal salt adapted to neutralize or modify uncombined acids and soluble products, and subjecting the material to heat at a temperature and for a time insufficient to cause final hardening of the product, but sufficiently to neutralize or modify acids and solubles and to cause a secondary reaction between the hardening agent and the mass, the product thereby produced being adapted to flow under heat and to be subsequently hardened in a mold.

4. A process of producing a plastic product, comprising, heating a carbohydrate-containing vegetable material with a phenol and a mineral acid agent with the proportions of phenol and vegetable material so adjusted that the heating produces a sticky, gummy, partially disintegrated mass, continuing the treatment until such a mass is produced, containing uncombined organic acid, soluble sacchoroses and soluble products thereof, and mixing therewith a salt of an alkaline earth metal selected from the group consisting of the sulphate and the carbonate of an alkaline earth metal sufficient in quantity, upon subsequent heating, to neutralize or modify substantially all uncombined acid and soluble saccharoses and products thereof remaining in the product.

5. A process of producing a plastic product, comprising, heating a carbohydrate-containing vegetable material with a phenol and a mineral acid agent with the proportions of phenol and vegetable material so adjusted that the heating produces a sticky, gummy, partially disintegrated mass, continuing the treatment until such a mass is produced, capable of further reaction under heat, and containing uncombined organic acid, soluble saccharoses and soluble products thereof, grinding the product in water, drying, adding a hardening agent and an alkaline earth metal salt adapted, on further heating to neutralize acid and modify soluble products remaining in the product, and heating the mixture in a closed vessel sufficiently to cause neutralization of acid in the mass, and insufficiently to prevent flow of the mass in a mold when placed therein for a final hardening reaction.

6. A process of producing a plastic product, comprising, heating a carbohydrate-containing vegetable material with a phenol and a mineral acid agent with the proportions of phenol and vegetable material so adjusted that the heating produces a sticky, gummy, partially disintegrated mass, continuing the treatment until such a mass is produced, capable of further reaction under heat, and containing uncombined organic acid, soluble saccharoses and soluble products thereof, and mixing therewith hexamethylenetetramine and a salt of an alkaline earth metal selected from the group consisting of the sulphates and the carbonates of barium and calcium sufficient, on subsequent heating, to neutralize or modify substantially all uncombined acid and soluble saccharoses and products thereof remaining in the product, and to combine with ammonia when evolved from the hexamethylenetetramine.

7. A process of producing a plastic product, comprising, heating a carbohydrate-containing vegetable material with a phenol and a mineral acid agent with the proportions of phenol and vegetable material so adjusted that the heating produces a sticky, gummy, partially disintegrated mass, continuing the treatment until such a mass is produced, containing uncombined organic acid, soluble saccharoses and soluble products resulting from them, grinding and treating with water, and mixing therewith an alkaline earth metal salt sufficient to substantially neutralize or modify substantially all uncombined acid and soluble sacchoroses remaining in the product, the alkaline earth metal salt added varying in quantity from an amount about equal in weight to that of the partially disintegrated mass to which it is added to a small percentage thereof, in accordance with the proportion of uncombined acid and soluble saccharoses remaining in the mass at the time such addition is made.

8. A process of producing a plastic product, comprising, heating a carbohydrate-containing vegetable material with a phenol and a mineral acid agent, continuing the treatment until a sticky, gummy, partially disintegrated mass is produced containing uncombined organic acid, soluble saccharoses and soluble products resulting therefrom, grinding the material in water, draining off the water, and mixing with the material an alkaline earth metal salt sufficient to substantially neutralize or modify substantially all uncombined acid and soluble saccharoses and soluble products resulting therefrom remaining in the product.

9. A process of producing a plastic product, comprising, heating a carbohydrate-containing vegetable material with a phenol and a mineral acid agent with a greater proportion of reactive vegetable material than the phenol, continuing the treatment until a sticky, gummy, partially disintegrated fusible mass is produced, capable of further reaction under heat, and containing uncombined organic acid and soluble saccharoses and soluble products resulting therefrom, grinding the product in water, and mixing therewith an alkaline earth metal salt in the proportion of from seven-tenths of the dried powder to substantial equality therewith, by weight.

10. A process of producing a plastic product, comprising heating a carbohydrate-containing vegetable material with a phenol and a mineral acid agent with a greater proportion of reactive vegetable material than the phenol, continuing the treatment until a sticky, gummy, partially disintegrated, fusible mass is produced, containing considerable amounts of uncombined organic acid, soluble saccharoses, and soluble products resulting therefrom, and mixing therewith an alkaline earth metal salt sufficient in quantity to largely neutralize and modify all uncombined acid and soluble saccharoses remaining in the product, and a gas-evolving methylene-containing hardening agent, the quantity of alkaline earth metal salt being calculated by the test, that with either an insufficient or an excessive amount there is marked gassing in the mold when the material is subsequently heated therein.

LEMUEL R. JONES.